US005641449A

United States Patent [19]
Owens

[11] Patent Number: 5,641,449
[45] Date of Patent: Jun. 24, 1997

[54] METHOD AND APPARATUS FOR HIGH-SPEED DRYING AND CONSOLIDATING OF STRUCTURAL FIBERBOARD

[76] Inventor: Thomas L. Owens, 631 Sylvan Ct., Batavia, Ill. 60510

[21] Appl. No.: 528,567

[22] Filed: Sep. 15, 1995

[51] Int. Cl.$^6$ .................. B29C 35/12; B29C 67/00
[52] U.S. Cl. .................. 264/404; 264/316; 264/324; 264/449; 264/479; 264/489; 264/491; 425/174.4; 425/174.8 R; 425/174.8 E; 425/383
[58] Field of Search .................. 264/316, 324, 264/404, 449, 479, 489, 491; 425/174.4, 174.8 R, 174.8 E, 383

[56] References Cited

U.S. PATENT DOCUMENTS

| | | | |
|---|---|---|---|
| 4,111,744 | 9/1978 | Reiniger | 264/491 X |
| 4,702,870 | 10/1987 | Setterholm et al. | 264/87 |

FOREIGN PATENT DOCUMENTS

| | | | |
|---|---|---|---|
| 3011559 | 10/1981 | Germany | 264/449 |
| 57-47641 | 3/1982 | Japan | 264/489 |

*Primary Examiner*—Leo B. Tentoni
*Attorney, Agent, or Firm*—Patrick D. Ertel

[57] ABSTRACT

Methods and apparatus for rapidly drying and compacting wet fiber mats are disclosed. Rapid drying is produced by heating the wet fiber mats with a combination of radiowave energy and conductive heating. As the fiber mats are heated, three-dimensional compacting forces are applied by pressing the fiber mats between a flat surface press and a porous support on which is mounted a resilient mold insert. At high radio frequencies in the microwave range, power is transmitted from a multimode cavity through the porous support and resilient mold insert to the fiber mat. At low radio frequencies, differential radio-frequency voltages are applied directly to metal press plates which contain and compact the fiber mat. Methods and apparatus can be adapted to conveyorized or multi-opening press operations. Objects suitable for use with the invention are most commonly characterized by having a flat face surface on one side and webs or other features which may extend normal or generally normal to the flat surface.

19 Claims, 5 Drawing Sheets

METHOD AND APPARATUS FOR HIGH-SPEED DRYING AND CONSOLIDATING OF STRUCTURAL FIBERBOARD

FIELD OF THE INVENTION

This invention relates generally to fiberboard products, and particularly to a method and apparatus for high-speed drying and consolidating of sculptured or molded fiberboard products utilizing radiowave heating.

BACKGROUND OF THE INVENTION

The invention concerns itself with the production of a certain class or definition of three-dimensional fiberboard objects. These objects may be components of assembled products or stand-alone and fully complete products. These fiberboard objects are characterized most often by having one flat surface and having the opposite surface composed of three-dimensional features, such as webs and flanges, which extend away from the flat side. Formation of such articles in prior art requires the use of a porous support member on which are mounted several embodiments of resilient mold inserts. The porous support member may include a screen, which facilitates moisture movement away from the webs of the fiberboard object. Wood fibers are prepared as a thin slurry in the conventional manner and deposited onto the molds to deposit the fibers on top of and between the molds. The water or other carrier fluid is withdrawn through the fiber mat and out the porous support.

A force which is normal to the flat side of the wet mat is next applied to the loose mat. The normal force causes it to become more dense and drives out most of the water. Reaction of the resilient mold, which typically consists of an array of nubs or protuberances, to the normal force produces the three-dimensional formed shapes on the side of the fiber mat opposite the flat face. At this point in the process, the partially de-watered and formed mat can be removed to a separate apparatus for drying, or dried directly within the de-watering apparatus. In the drying process, the normal force is maintained as heat is typically applied primarily to the flat side of the wet mat. The heat vaporizes most of the remaining water and facilitates fiber bonding. After adequate drying and after removal of consolidating pressure, the mat retains its form and has a ratio of strength to weight that is higher than many other wood-based products. The fiberboard product thus formed can be joined with other fiberboard objects to form complete assemblies which also possess high strength-to-weight ratios.

Prior art teaches a method for heating the wet fiber mat by contacting the surfaces of the mat with heated platens. By this method, heat from the platens must be transferred to the interior of the mat by thermal conduction through the fiber mat. Because wood fiber is a poor conductor of heat, little energy from surface heat is available for vaporization of water in the wet interior of the mat as the surface of the mat, which is in contact with the heated platen, dries. Thermal conduction is particularly slow in the web regions of the mat, where heat conduction paths are longest. The result is that drying times can be long, especially for thick products. Slow drying times for these wet fiber mats have prevented efficient, high-speed mass-production of sculptured fiberboard products that are thicker than approximately one-half inch. This limitation has hindered commercialization of a wide range of new applications for sculptured fiberboard in the construction, furniture, material handling, and packaging industries.

SUMMARY OF THE INVENTION

The present invention teaches a method and apparatus for rapid drying and compacting of wet fiber mats using a combination of radiowave energy and surface heat which are applied to the mat as it is compressed under three dimensional forces. Objects suitable for use with the invention are most commonly characterized by having a flat face surface on one side and webs or other configurations which may extend normal or generally normal to the flat surface.

The term, radiowave, is defined as an electromagnetic wave having a radio-frequency. Radio-frequencies lie in the range of about 10 kilohertz up to 30 gigahertz. The various embodiments of the invention fall into two general classes which depend upon operating wavelength. The first class occurs for radio-frequency wavelengths which are much greater than the size of the apparatus disclosed herein. This range of wavelengths corresponds to radio-frequencies below approximately several hundred megahertz. Electromagnetic waves in this frequency range will be referred to as low-radio-frequency, or LRF, waves. The second class of embodiments occurs for radio-frequency wavelengths comparable to or much smaller than the disclosed apparatus. This range of wavelengths corresponds to radio-frequencies above approximately several hundred megahertz. Electromagnetic waves in this frequency range will be referred to as microwaves. The term, radiowave, will be retained to encompass the full range of frequencies from about 10 kilohertz to 30 gigahertz.

In the microwave frequency range, the disclosed apparatus generally will include a porous support member on which are mounted a resilient, non-metal mold insert. The porous support member consists of a non-metal porous surface, a support structure for the non-metal porous surface, and a multimode microwave cavity enclosure. The non-metal porous surface may consist of a non-metal screen supported by an array of non-metal tiles. A cold-pressed, pre-formed wet fiber mat is prepared from a thin slurry containing wood fibers. The prepared mat may be produced in a separate apparatus containing an identical mold insert or using other equipment within the disclosed apparatus. This pre-forming apparatus, which may or may not use parts of the disclosed apparatus, is not part of the present invention, but is described in prior art. The prepared mat is mounted to the mold insert of the present invention.

The support structure for the non-metal porous surface, which makes up part of the porous support member, may consist of a set of metal support rails or beams which span the width of the apparatus. Below the support rails is the multimode microwave cavity. The multimode microwave cavity consists of a largely open volume into which radiowaves are applied from an external source.

The cavity dimensions for the present invention are normally much greater than a wavelength of the applied microwaves. With these dimensions, many microwave modes or characteristic stationary microwave field patterns are produced within the cavity, leading to the naming convention, multimode microwave cavity. The superposition of these modes facilitates production of a uniform distribution of microwave fields and a randomization of microwave field polarization or field vectors within the cavity. Uniformity of microwave fields and randomization of field polarization is enhanced through the use of a revolving or otherwise moving reflector placed within the cavity. The structure and movement of the reflector are designed to break up any potentially regular electromagnetic field patterns that might be otherwise established in the multimode cavity.

Microwave energy is transmitted from the multimode cavity, to the space between the support rails. From there it passes through the non-metal porous surface member and the resilient mold insert to the pre-formed wet mat. The width of the support rails and the distance the microwaves travel between the rails is approximately an integral number of half wavelengths at the applied microwave frequency. This assures that microwave energy will be most efficiently transferred to the fiber mat from the open cavity.

A flat surfaced press, which itself is porous, applies a normal force to the pre-formed mat. The normal force produces a pressure on the mat surface of approximately 100–200 pounds per square inch to compress the mat as it dries. The resilient non-metal mold responds to the normal force by compressing the mat in three dimensions. The flat surfaced press and an optional metal frame enclosing the perimeter of the fiber mat are heated to temperatures between 212 and 400 degrees Fahrenheit to quickly remove surface moisture from the fiber mat without overheating and damaging the fiber mat. Microwaves are applied simultaneously with surface heat from the heated press which is in contact with the wet fiber mat. Microwave heating vaporizes moisture deep inside the mat and drives moisture to the surface where it is readily vaporized by platen surface heat and readily removed from the mat via the porous members.

Using LRF waves, the porous mold support member becomes a simple metal plate which is electrically insulated from the metal plate of the flat surface press. The porous support member and the flat surface press plate are both heated to approximately 212–400 degrees Fahrenheit. In this case, the wet fiber mat is pressed between these members. Radiowave differential voltage is applied between the porous support plate and the press plate. In electrical terms, the apparatus is essentially a large capacitor with a lossy dielectric consisting of the wet fiber mat and the mold insert. The LRF wave energy performs a drying function similar to that described for the microwave embodiment described above.

The LRF wave heating embodiments are more compact than the microwave embodiments. They can be readily adapted to stacked, multi-opening press operations, useful in mass-production. The microwave embodiments, on the other hand, provide much greater efficiency than LRF wave heating embodiments. Better moisture uniformity can also be achieved. Their large dimension normal to press movement makes them less desirable in stacked multi-opening press operations. However, since microwaves propagate readily across spaces within the apparatus, embodiments are well suited to continuous conveyorized approaches, where multiple fiber mats are constantly irradiated with microwaves as they move continuously through a largely open microwave cavity. The movement of the mats within a conveyorized embodiment facilitates uniform irradiation over the mat surface, as well.

To conserve energy, the apparatus may include a heat exchanger system for recovering heat energy contained in the steam produced by vaporization of moisture within the wet fiber mat. This energy recovery system may include a heat pump. Using a heat pump, the escaping steam is cooled and condensed in a heat exchanger. Heat energy from the steam channel is transferred to the working fluid used in the heat exchanger, raising its temperature. Compression of the heat exchanger working fluid raises its temperature still further. The high-temperature fluid can then supplement heat provided to the top mold or other heated parts of the apparatus. Implementation of heat pump systems is a well known art, readily adapted to the present invention.

ADVANTAGES OF THE INVENTION

Compared to prior art, the present invention results in dramatic increases in drying speed of wet sculptured fiber mats used in the production of sculptured fiberboard products or components. The method which produces these increases in drying speed involves application of radiowave energy and surface heat simultaneously to the wet sculptured fiber mat as it is dried and simultaneously compacted. The combined drying method and compaction method for sculptured fiberboard disclosed in this invention is not taught in the prior art. New apparatus are described here which simultaneously apply radiowaves and surface heat to the wet sculptured fiber mat along with the compressive force used to densify the mat. The apparatus produce an essentially uniform moisture distribution within the finished fiberboard product or component.

Radiowave energy is applied from an external source and surface heat is applied from a heated platen. The radiowave energy penetrates deep into the interior regions of the wet fiber mat. Deposition of electromagnetic energy heats and vaporizes water and dries the interior regions of the mat that cannot be readily dried with heat from the heated platen which contacts the flat surface of the mat. On the other hand, the heated platen vaporizes very effectively moisture close to the flat face surface of the mat. The two heating methods thereby complement one another.

Some of the interior water is driven to the surface indirectly through microwave heating and steam pressurization in the interior of the mat. Water driven to the surface in this way is rapidly vaporized by platen heat at the surface of the mat. By this mechanism, radiowaves indirectly improve the vaporization effectiveness of surface heat in addition to directly vaporizing a large fraction of moisture within the mat.

By applying a combination of radiowave energy and surface heat simultaneously, good moisture uniformity is obtained and operating costs can be kept low for a given product throughput when compared to applying radiowaves with little or no surface heating. Platen heat can be provided from a variety of sources, including natural gas, which is currently one of the least expensive sources of heat energy. Radiowave energy, on the other hand, is more expensive. The optimum economy of operation can be realized by operating the platen at the highest temperatures possible. This method will minimize microwave power consumption for a given product throughput.

The present invention teaches a method and apparatus for drying sculptured fiberboard using microwaves and surface heat, and simultaneously forming the sculptured fiberboard by application of pressure generally normal to the surface of a wet fiber mat which is mounted to a resilient mold insert.

BRIEF DESCRIPTION OF THE DRAWINGS

The invention will be better understood with reference to the accompanying drawings, also forming part of this disclosure, wherein.

DETAILED DESCRIPTION OF THE PREFERRED EMBODIMENTS

Microwave Embodiments

Figure 1:
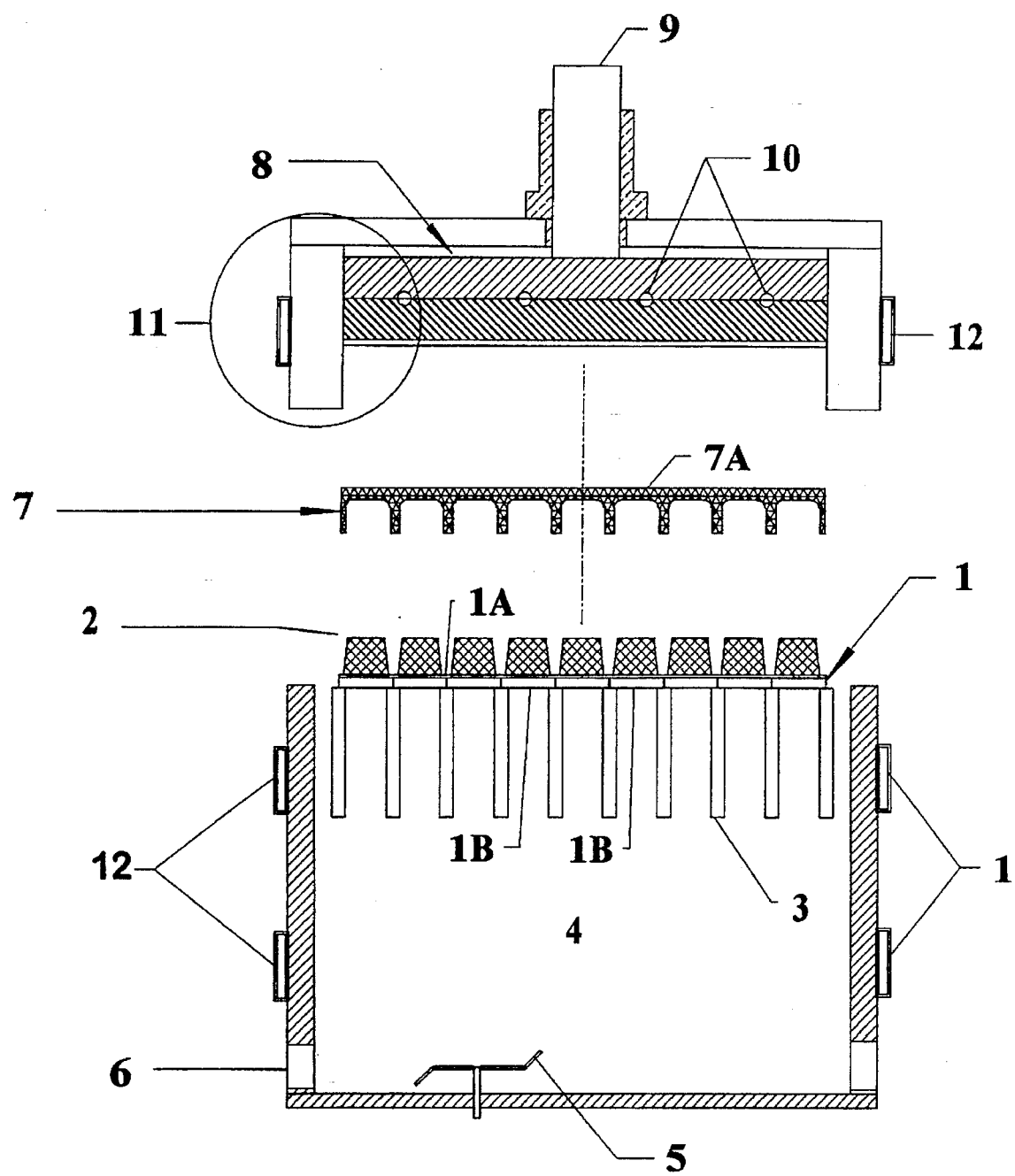
FIG. 1 is a schematic drawing of a first embodiment of the method and apparatus applicable to microwave frequencies.

FIG. 1 is an illustration of one embodiment of the invention at microwave frequencies. The invention utilizes a non-metal porous carrier 1 which may be in the form of a non-metal porous screen, 1A, mounted to an array of non-metal tiles, 1B. For example, the non-metal porous screen can be made of Chemglas, which is a trademark of the Chemical Fabrics Corporation. The non-metal tiles can be made of a suitable ceramic such as alumina. Suitably fixed to the porous carrier 1 is a non-metal resilient mold insert 2 which will define, by its structure, the final configuration of the structural fiberboard objects to be produced in accordance with the invention. The mold insert 2 is essentially an array of nubs or protuberances evenly distributed over the surface of the carrier 1. The material comprising the mold insert 2 may be silicone rubber or other suitable resilient material that can withstand temperatures of approximately 300–400 degrees Fahrenheit and which is a relatively weak absorber of microwave power. The mold insert nubs may be solid, hollow, or a composite of resilient materials. Hollow mold insert nubs would have a means of inflating the molds to a determined size and pressure.

The non-metal tiles which comprise the non-metal porous carrier are suitably attached to a set of support rails 3 which are essentially spaced at the same intervals as the non-metal tiles making up the non-metal porous carrier 1. The non-metal porous carrier 1 together with the support rails 3 make up a porous support which holds the mold insert 2 rigid. The support rails 3 may be spaced other ways, as long as they provide sufficient support for the porous carrier 1. The support rails 3 may be composed of metal or non-metal materials. The width of the support rails 3, that is the vertical dimension in FIG. 1, is approximately an integral number of wavelengths at the applied microwave frequency, and is also sufficiently wide to support the non-metal porous carrier 1 and maintain suitable flatness of the non-metal porous carrier 1 as pressures in excess of 100 pounds per square inch are applied to the top of the non-metal porous carrier 1.

The support rails 3 may be attached to the enclosing walls of the apparatus at each end of the support rails 3 or they may be attached to plates, which are not attached to the enclosure, at each end of the support rails in applications where the support rails 3, non-metal porous carrier 1, and mold insert 2, are moving in continuous processing embodiments. The support rails 3 can also be attached at one end and a space left at the opposite end, with mechanical support of the spaced ends coming from beneath the ends of the rails, rather than at the ends of the rails. The various embodiments of the support rails are designed to allow efficient transfer of microwave power into the wet sculptured fiber mat.

Below the support rails 3 is a largely vacant cavity 4 comprising a volume whose boundaries are defined by a metal enclosure. Microwaves are introduced into the cavity 4 from an external source. The cavity dimensions into the paper and across the width of the paper, referring to FIG. 1, are typically several wavelengths at the applied microwave frequency. The vertical dimension of the cavity 4 can be much less than several wavelengths, although the apparatus works best if this dimension is also several wavelengths. With suitably large dimensions, many microwave modes or characteristic stationary microwave field patterns are produced within the cavity 4. The superposition of these modes facilitates production of a uniform distribution of microwave fields and a randomization of microwave field polarization or field vectors within the cavity.

Uniformity of microwave field distribution and randomization of field polarization within the cavity 4 is further enhanced through the use of a suitable revolving or otherwise moving microwave reflector 5. The moving reflector 5, can be a moving device suitably placed within the cavity 4, or it can be a moveable portion or portions of the cavity enclosure.

The largely uniform and randomly polarized microwave fields produced within the cavity 4 are transmitted between the support rails 3, through the porous carrier 1, and the mold insert 2, with little attenuation. Power transfer efficiency is optimized by choosing vertical dimensions for the support rails approximately equal to an integral number of half wavelengths at the applied microwave frequency, and by choosing low power-loss materials.

Microwaves from an external source enter the cavity 4, through a suitably dimensioned and suitably positioned aperture 6 cut into the walls of the cavity enclosure. A suitable microwave tuning apparatus may be attached to the aperture in order to maximize power transfer from an external microwave source into the cavity 4. Such a tuning apparatus is well known to those skilled in the art.

A cold-pressed, pre-formed wet mat 7 of sculptured fibers from which the final sculptured fiberboard object is made, is mounted over the mold insert 2. This pre-formed wet mat 7 is prepared in a separate process similar to the early steps of the process disclosed in U.S. Pat. No. 4,702,870 to Vance C. Setterholm and John F. Hunt. Teaching of the preparation of the pre-formed wet mat 7 contained in U.S. Pat. No. 4,702,870 is not part of the present invention. The pre-formed mat 7 is produced in another apparatus or with suitable modifications to the present apparatus. In the pre-forming process and apparatus, a thin slurry of fibers is distributed over a mold whose shape and properties are similar to the mold insert described in this first embodiment of the present invention. The thin slurry of fibers is dewatered and compressed in a cold press to remove most of the free water and give the mat its basic preliminary shape. The mat is removed from this pre-forming apparatus or equipment and placed in the apparatus described here as a final processing step in which final compaction and drying takes place.

The pre-formed mat 7 is then pressed between the mold insert 2 and a heated top mold 8. The top mold 8 produces a pressure normal to the flat face, 7A, of the fiber mat of approximately 100–200 pounds per square inch. The resilient mold insert 2 responds by producing forces parallel and other than parallel to the normal force exerted by the moving mold 8. This is because of the particular nature of the resilient materials which comprise the mold insert 2. The resultant forces densify the fiber mat in three-dimensions.

Force is exerted on the top mold 8 from a ram rod 9 connected to the center of the top mold 8. Force is exerted on the ram rod 9 from an external hydraulic press mechanism. For large top mold plates, multiple guide rods which ride on linear bearings may be used to maintain alignment of the top mold as it presses the fiber mat. Other press mechanisms exist for suitably moving the top mold 8 which are known to those skilled in the art. The top mold may have internal channels 10 which contain electric heating elements to heat the top mold. Similar channels may be provided to allow steam heating or other gaseous or fluid heating of the top mold 8. Heating of the entire apparatus is provided through a set of electric band heaters 12 which are in contact with the exterior walls of the device. Other methods of heating these surfaces, such as steam heating, may be substituted for electric heat. Heating of the entire apparatus to temperatures of at least 212 degrees Fahrenheit prevents moisture from condensing on interior surfaces.

Figure 2:
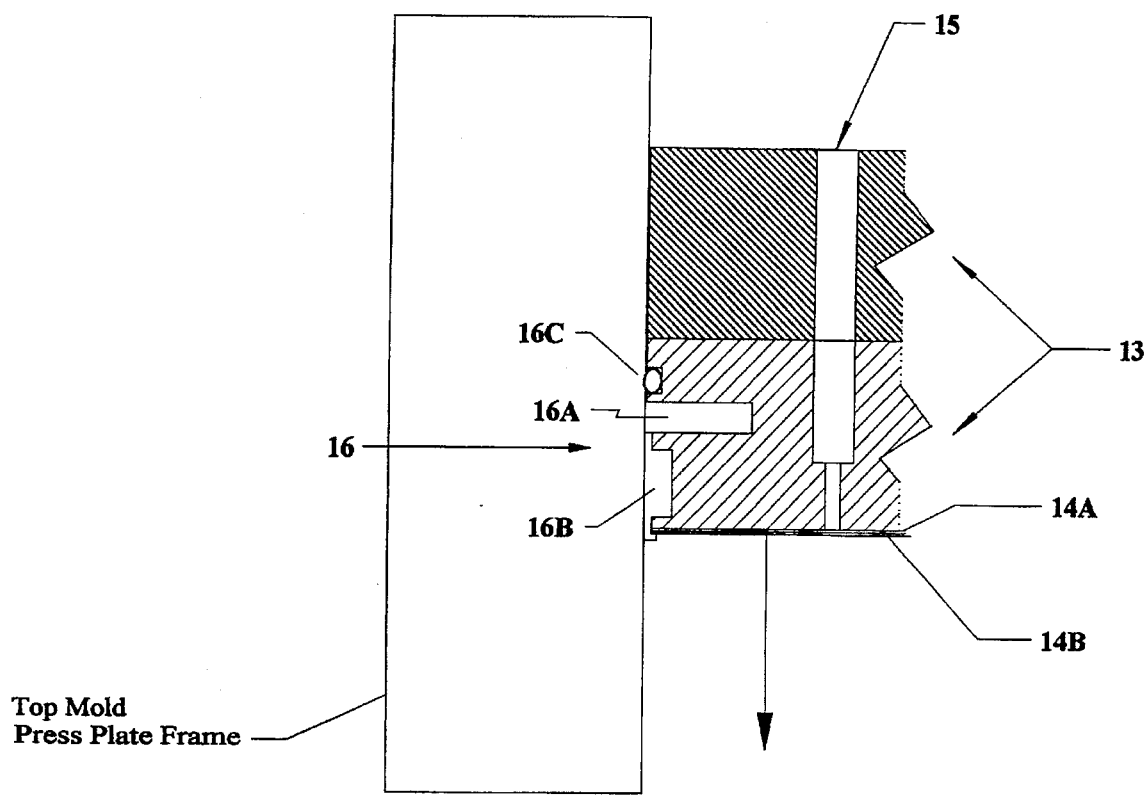
FIG. 2 is a schematic drawing of an embodiment of a sliding microwave choke member of the invention included in a moveable press member of the invention.

The top mold itself is porous or it is comprised of porous members which permit venting of water and water vapor from the flat face of the fiber mat as it dries. In one embodiment illustrated in FIG. 2, the top mold comprises a pair of rigid metal plates 13 covered with a woven metal screen 14A which is, in turn, covered with a perforated metal screen 14B. The details shown in FIG. 2 represent a magnified view of the region circled in FIG. 1, and referenced with numeral 11. Water and water vapor from the wet fiber mat pass through these porous members, 14A and 14B, and out of the apparatus through an array of small vent holes 15 in the rigid support plates 13.

Around the perimeter of the top mold 8, is a microwave choke, 16. The microwave choke reflects microwaves that impinge upon the space between the moving mold and the fixed frame of the moving mold 8. By reflecting microwaves at this point, containment of microwaves within the apparatus is facilitated. Microwaves must be stringently confined within the apparatus to avoid hazardous irradiation of nearby personnel and interference with electronic equipment. One embodiment of the microwave choke, 16, is illustrated in FIG. 2. The choke, 16, comprises a pair of channels, 16A and 16B, formed completely around the perimeter of the top mold support plates 13 and set at suitable angles relative to one another.

Each of the channels, 16A and 16B, is effectively a one-quarter wavelength section of waveguide. Characteristic of a quarter wave section, a microwave short circuit at one end of the section is transformed to an open circuit at the other end. Conversely, a microwave open circuit at one end of a quarter wave section is transformed to a short circuit at the opposite end. The short circuit at the right side of the upper channel, 16A, of the choke, 16, is therefore transformed to approximately an open circuit at the juncture between channels, 16A and 16B. Traversing another quarter wavelength across the lower channel, 16B, produces a short circuit in the space between the top mold 8 and the top mold press plate frame where microwaves enter the choke channel, 16B. The impedance presented to microwaves at this point is comparable to the impedance of a metal, causing effective reflection of the microwaves.

Near the juncture of the two channels, 16A and 16B, comprising the microwave choke 16, a sliding metal contact 16C bridges the space between the moving top mold support plates 13 and the frame of the top mold. The sliding metal contact, 16C, reflects any small residual microwave power that might make it past the microwave choke 16. A suitable microwave absorbing material or a second microwave choke can be substituted for the sliding metal contact, 16C, near the juncture of the two channels, 16A and 16B, comprising the microwave choke 16. Since the microwave impedance at this juncture is nearly an open circuit, currents will be minimal, due to the nature of microwaves. Minimal current will thereby pass through the sliding metal contact 16C or any other structure placed at this juncture.

Figure 3:
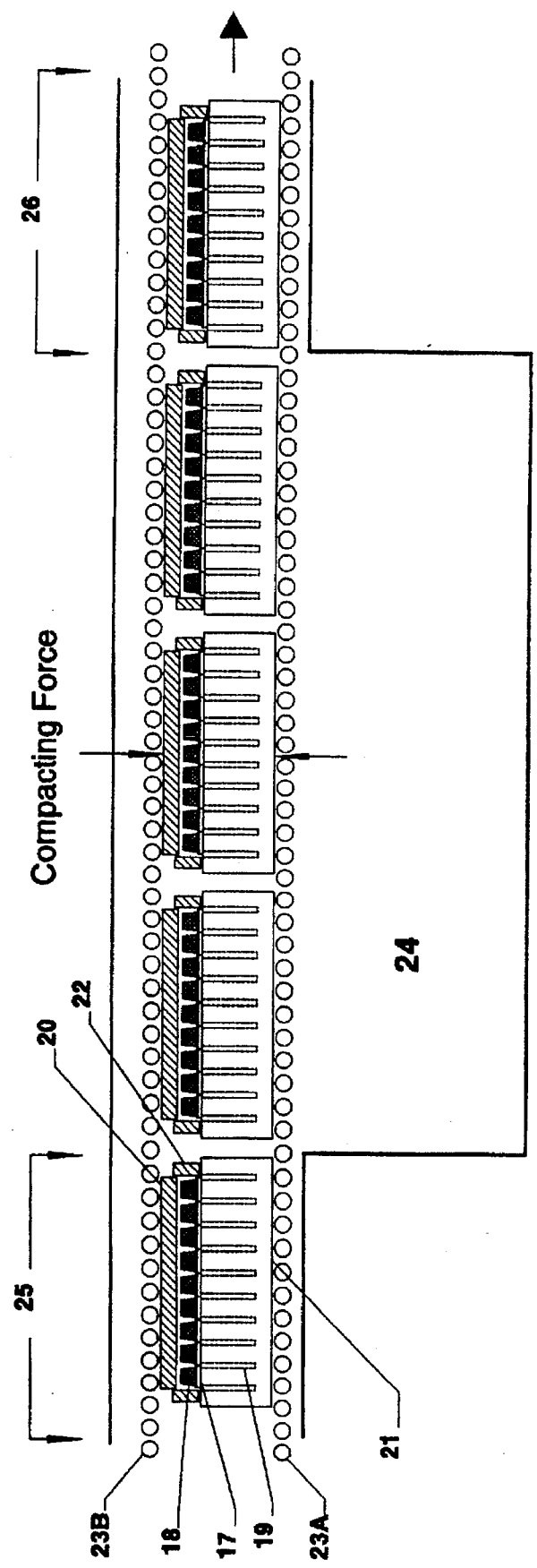
FIG. 3 is a schematic drawing of a second embodiment of the invention illustrating a conveyorized method and apparatus.

The porous carrier 1, mold insert 2, support rails 3, and top mold 8 can be a stationary assembly for batch type processing or these elements can form a moving carrier assembly for the fiber mat 7 so as to be part of a continuous production process. In this situation, the cavity portion, 4, of the apparatus into which microwaves are introduced would be enlarged to accommodate the movement of this carrier assembly. FIG. 3 is an illustration of an embodiment which permits continuous production. In this embodiment, the porous carrier 17, mold insert 18, support rails 19, top mold 20 and top mold frame, 22, have construction similar to members having the same names in the embodiment illustrated in FIG. 1 except that in the present embodiment these members form a moveable assembly which carries the wet fiber mat. The ends of the support rails are attached to a carrier plate 21 which rides upon a plurality of rollers 23A arranged in an approximate linear fashion. The top mold 20 of the moveable carrier assembly is in contact with a second plurality of rollers 23B which is also arranged in an approximate linear fashion.

The vertical separation between rollers 23A and 23B decreases in the direction of movement of the moveable carrier assembly. The reduction in separation between roller arrays causes the top mold 20 to move vertically and press against the fiber mat. Separation of the roller arrays 23A and 23B and rate of translation of the fiber mat and carrier assembly between the roller assemblies are coordinated to maintain a pressure of approximately 100–200 pounds per square inch or other predetermined pressure as the fiber mat moves through the apparatus and dries.

Beneath the carrier assembly is an open cavity 24 into which microwaves are introduced. In the present embodiment, this cavity 24 will usually have dimensions much larger than the cavity 4 used in the embodiment illustrated in FIG. 1. Microwaves can be introduced into the cavity 24 through an aperture or a plurality of apertures. A single external microwave source or a plurality of microwave sources can feed microwave power into the cavity 24.

At either end of the apparatus is a tunnel entry 25 and 26. The moveable carrier nearly fills this tunnel which facilitates containment of microwaves within the apparatus. The tunnel walls are equipped with suitable means for preventing escape of microwaves. Suitable means are well known to those skilled in the microwave arts. For example, the tunnel entries 25 and 26 may be equipped with various quarter wave stubs and microwave absorbers suitably positioned to reflect and absorb microwaves in the tunnel sections.

The top mold 20 may have a thickness and corresponding volume that makes it unnecessary to heat the mold as it traverses the apparatus. With suitable top mold mass, enough stored heat exists within the top mold 20 to vaporize all of the water within the wet fiber mat. The top mold 20 may therefore be preheated to approximately 200–400 degrees Fahrenheit outside the apparatus before joining with the moveable carrier assembly. No further heat need be applied to the top mold as it traverses the apparatus.

The temperature of the top mold declines as it contacts the wet fiber mat and looses energy to vaporization of water within the fiber mat. The temperature drop must not be so large as to bring the temperature of the top mold down below approximately 212 degrees Fahrenheit where water condenses at atmospheric pressure. As an example, a top mold composed of an aluminum plate having a thickness of 10 centimeters will cool by approximately 100 degrees Fahrenheit if all of the water within a fiber mat containing 0.57 grams of water per square centimeter of surface is vaporized by heat from the top mold. Preheating this exemplary top mold to approximately 350–400 degrees Fahrenheit will assure that adequate surface heat is applied passively throughout the drying process. Elimination of the need for active heating of the top mold eliminates the necessity for moving attachments associated with the top mold, greatly simplifying the apparatus.

The following is a list of specific parameters which resulted from experimental work which has been performed at microwave frequencies during the development of this invention:

1. Drying speed of 2.5 cm×45.7 cm×45.7 cm wood-fiber mats using a combination of microwaves and surface heat was increased by a factor of five compared to drying with surface heat alone.
2. Moisture content was reduced from approximately 65% to approximately 6–12% with a moisture variation across sample mats of approximately ±1.5%.
3. Surface temperatures of the top mold and top mold frame were 275 degrees Fahrenheit, and microwave power levels were approximately 2.2 kilowatts per square foot of fiber mat.
4. Microwave frequency was 2.45 gigahertz.
3. Mold insert nubs were composed of Silastic HS III silicone robber from the Dow Corning Corporation and were arranged in a 9×9 matrix to form a complete mold insert. Each mold insert nub was approximately 4.2 cm×4.2 cm at the base, 3.6 cm×3.6 cm at the top, and 3.4 cm high.
4. Porous member support tiles were composed of 5.1 cm×5.1 cm×0.95 cm AL-600 alumina ceramic from Wesgo Technical Ceramics, Incorporated.
5. Non-metal porous member screen was composed of 10 mil porous Chemglas, a trademark of Chemical Fabrics Corporation.
6. The porous member support rails were one wavelength in width, or 12.2 cm, 1.27 cm thick, 50.8 cm long and were composed of aluminum alloy 6061-T6.
7. The cavity section was dimensioned to 4.2×4.2×3.1 wavelengths.
8. A pressure of approximately 120 pounds per square inch was applied as microwaves and surface heat were simultaneously applied during drying of wet fiber mats.
9. The top mold porous member was composed of a 50 mesh woven stainless steel screen beneath a 20 mil perforated stainless steel sheet having 22% transparency by McNichols Company.
10. The sliding metal contacts consisted of medium tension canted coil springs by Bal Seal Engineering Company. The spring material was Hastelloy C-276, a trademark of Cabot Corporation.

LRF Embodiments

Figure 4:
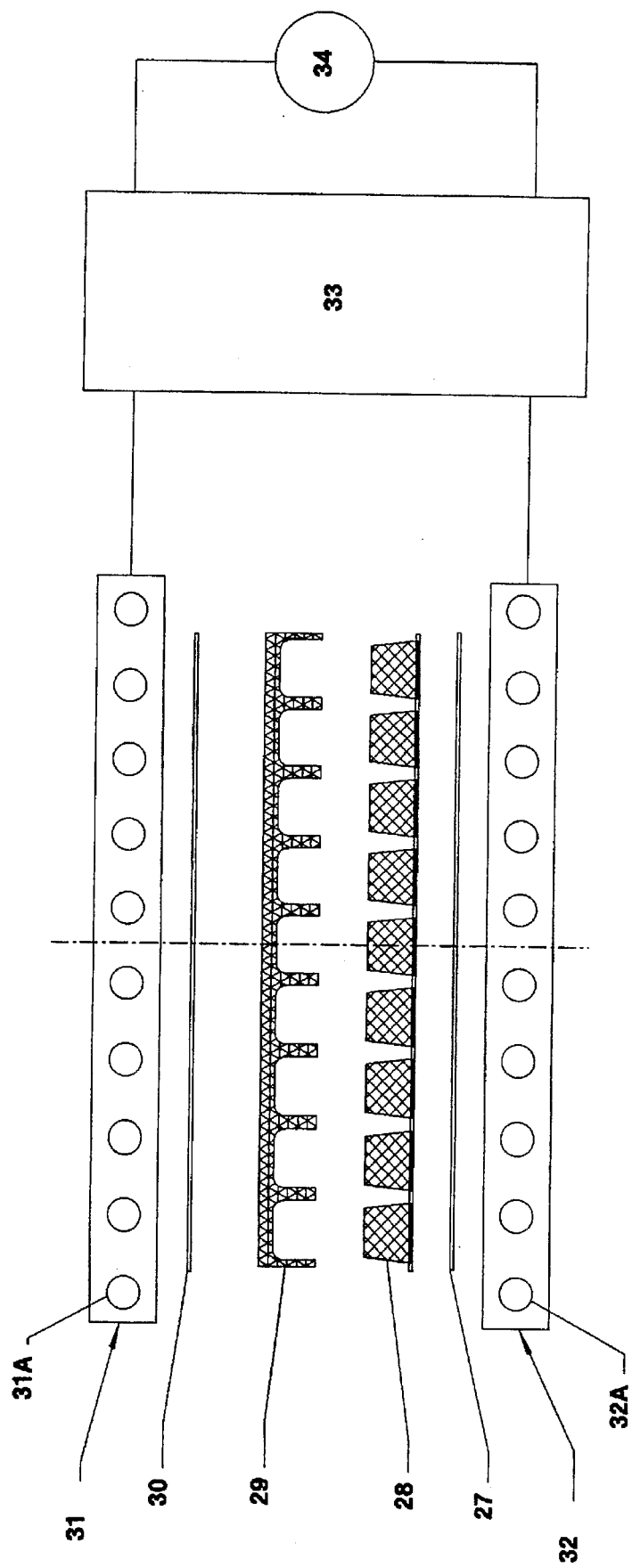
FIG. 4 is a schematic drawing of a third embodiment of the method and apparatus applicable to low frequency radiowaves.

FIG. 4 illustrates an exploded view of one embodiment applicable to low radio frequencies below approximately a few hundred megahertz. Similar to other embodiments just described, the embodiment utilizes a porous carrier 27 on which are mounted a plurality of spaced resilient mold insert nubs 28. A pre-formed cold-pressed wet fiber mat 29 is mounted onto the mold insert 28. A porous member, 30 is placed between the top of the fiber mat and a metallic flat-surfaced press plate 31. The mold insert 28 and the porous carrier 27 are mounted to a metal support plate 32. As in microwave embodiments, force is applied to the press plate 31 normal to its face. This normal force produces three-dimensional forming forces in the fiber mat, due to three-dimensional deformation of the resilient mold insert hubs 28.

Simultaneous with compaction, LRF voltage is applied to the top press plate 31 and the bottom support plate 32 which are electrically insulated from each other. Radio frequency voltage is applied through a direct conductor connection from an external supply of LRF waves. The external supply of LRF waves consists of a prime source 34 and a suitable lumped element impedance matching circuit 33. Elements of the impedance matching circuit are adjusted to insure that maximum LRF power is transferred from the LRF source, 34, to the plates, 31 and 32, and ultimately to the wet fiber mat, 29. Techniques and suitable configurations for impedance matching are well known to those skilled in the art.

LRF waves are applied to the wet fiber mat 29 in combination with surface heat from the top press plate 31 and the lower support plate 32. Heating channels 31A and 32A are shown in FIG. 4 through which heated steam or other medium may flow to heat the plates. Electric heaters may also be embedded within the plates. They may also be heated between drying runs and take advantage of thermal mass to passively maintain surface temperatures during drying, as described for microwave embodiments.

Figure 5:
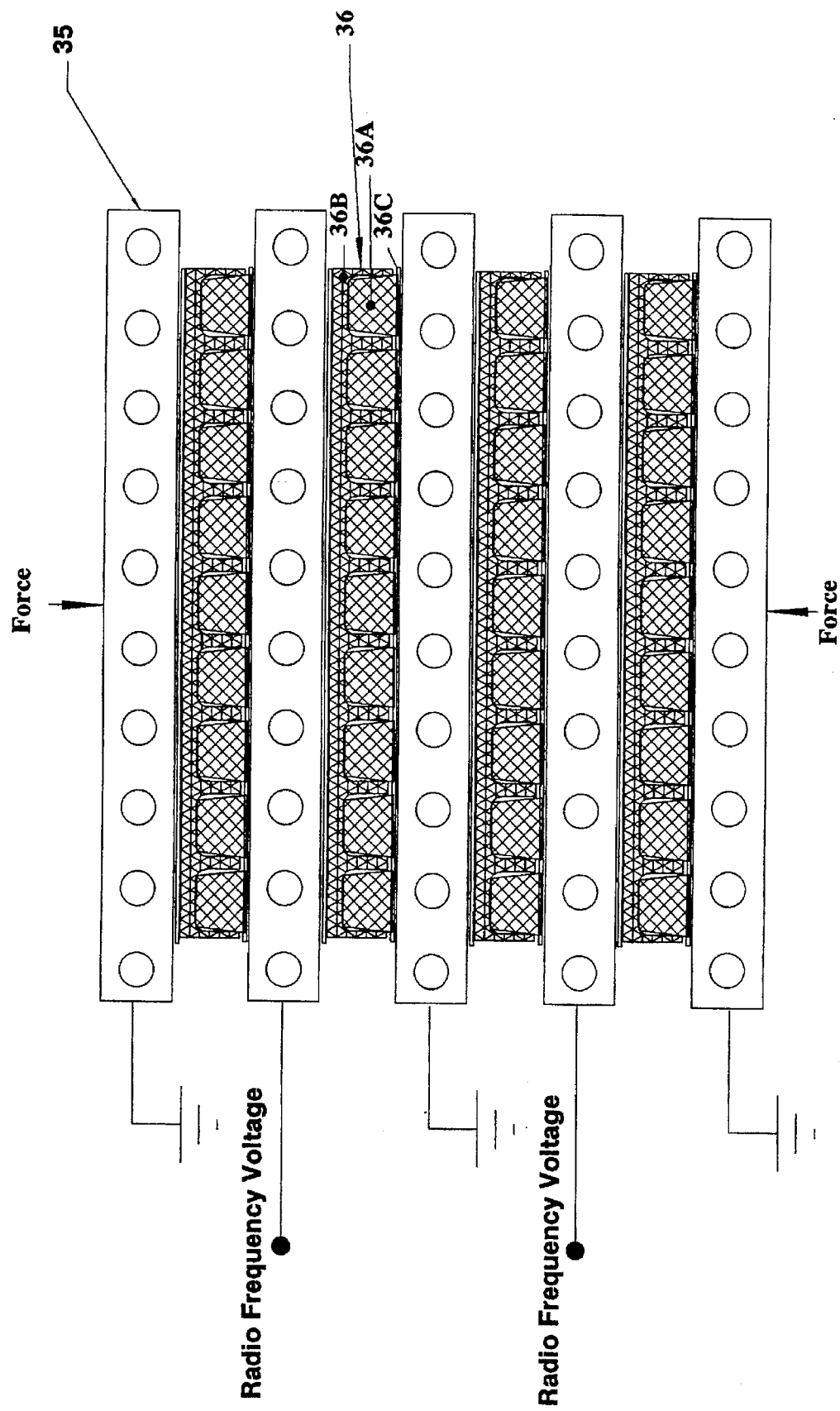
FIG. 5 is a schematic drawing of a fourth embodiment of the invention illustrating a means for drying multiple fiberboard objects simultaneously.

FIG. 5 shows an embodiment in which drying units are stacked vertically and pressed from above and below as an assembly. This technique and apparatus would be applied in a multi-opening press operation used in high-speed mass production. In this case, the resilient mold inserts 36A, pre-formed wet fiber mats 36B, and porous carriers 36C are shown connected together into individual assemblies 36. These assemblies are placed between a plurality of press plates 35. A force applied to the top of the stack of assemblies compacts each fiber mat as it did in a single unit. LRF voltage is applied to every other plate of the apparatus to provide LRF heating power to each fiber mat. LRF voltage can be distributed to the various plates from a single source, or from many individual sources. The plates are again heated as described earlier for a single unit.

Novel and Unobvious Features of the Invention

The invention is to be distinguished from other inventions for producing sculptured fiberboard in that it teaches a method and apparatus for greatly increasing drying speeds of sculptured fiber mats using radiowaves and surface heat which are applied to fiber mats simultaneously with large three-dimensional compacting forces resulting from one dimensional pressing forces.

Tests have been performed on a prototype of the present invention. Designs, procedures and results are documented in a non-public disclosure to the U.S. Department of Agriculture in Report No. USDA/33610-0076-2, dated Jul. 15, 1995. Test results, presented in the aforementioned disclosure, demonstrate that drying of sculptured fiberboard using the method and apparatus taught in the present invention is at least five times faster than drying using surface heat alone.

This dramatic increase in drying speed is a substantial extension of the state-of-the-art, removing one of the principal hindrances to high-speed mass-production of sculptured fiberboard, particularly thicker versions of this class of product. The present invention will allow commercialization of a wide range of new applications for sculptured fiberboard objects in the construction, furniture, material handling, and packaging industries. Other applications in additional industries will present themselves to those skilled in these arts.

While the invention has been described in detail above, it is to be understood that this is by way of example only and the protection granted is to be limited solely by the spirit of the invention and the scope of the following claims.

I claim:

1. A method of drying and consolidating an object of wood fiber, said object comprising a three-dimensional structure, comprising the steps of providing a drying and consolidating apparatus, said apparatus comprising a press member, a porous support, and a resilient mold insert on said support, depositing a prepared mat of wet wood fiber over said mold insert, applying a pressing force on said prepared mat and against said porous support and said mold insert using said press member to compress said mold insert to generate three-dimensional forming forces and densify said prepared mat, heating a surface of said prepared mat, permeating and heating said prepared mat with radiowave energy as said pressing force is applied, the temperature of said prepared mat being maintained at temperatures less than approximately 400 degrees F., compressing, drying, and forming said object of wood fiber from said prepared mat when a determined quantity of water has been removed from said prepared mat, and removing said object of wood fiber from said support and mold insert.

2. The method of claim 1 wherein said porous support comprises a non-metal porous surface member supported and held substantially rigid by a structural member.

3. The method of claim 2 wherein said non-metal porous surface member comprises a plurality of spaced tiles having a porous sheet member, said tiles being spaced for venting of moisture between said tiles and permitting flexure of said non-metal porous surface member, said non-metal porous surface member allowing transmission of said radiowave energy into said prepared mat, and said structural member comprises a plurality of spaced support rails to undergird and generally maintain flatness of said non-metal porous surface member during pressing of said prepared mat with said press member.

4. The method of claim 3, wherein said support rails are of a height of approximately an integral number of half wavelengths of said radiowave energy to permit efficient transmission of said radiowave energy along a transmission path between said support rails.

5. The method of claim 1, including at microwave frequencies a cavity enclosure containing said press member, said porous support and said mold insert, said cavity enclosure comprising an open volume having dimensions larger than approximately one wavelength of said radiowave energy and into which said radiowave energy is applied and distributed to permeate and heat said prepared mat through said porous support and said mold insert, including means for causing said radiowave energy to be approximately uniformly distributed within said cavity enclosure to promote uniform heating of said prepared mat, and further including means for preventing radiowave energy leakage from said apparatus as said pressing force is applied to said prepared mat.

6. The method of claim 1 including the step of adjusting power flow rate of said radiowave energy and surface heat flux to said prepared mat to levels dependent upon the moisture content of said prepared mat during and throughout the time period of drying of said prepared mat to optimize rapid drying of said prepared mat while avoiding arcing due to high electric fields and avoiding overheating said prepared mat.

7. The method of claim 1, including means for continuous formation of said object of wood fiber along a defined path, said means for continuous formation comprising a moving press member, a moving porous support, and a moving mold insert, and including means for continuously applying a force to said moving press member, said moving porous support and said moving mold insert over said defined path and including means for continuously applying said radiowave energy over said defined path of said moving press member, said moving porous support, and said moving mold insert.

8. The method of claim 7, wherein said means for continuously applying a force comprises a plurality of spaced rollers above and in contact with, and a plurality of spaced rollers below and in contact with said moving press member, said moving porous support, and said mold insert containing said prepared mat, the distance between said rollers above and said rollers below decreasing as said moving press member, said moving porous support, and said moving mold insert proceed along said defined path so as to compress, densify, and dry said prepared mat continuously.

9. The method of claim 1, wherein said porous support and said press member are metallic and electrically insulated from each another, and including the step of applying a radio frequency differential voltage to said metallic porous support and said metallic press member to provide low radio frequency heating of said prepared mat.

10. Apparatus for drying and consolidating an object made from wood fiber, said object comprising a three-dimensional structure, comprising a press member, a porous support, a resilient mold insert on said porous support, means for depositing a prepared mat of wet wood fiber over said mold insert, means for applying a pressing force to said press, said mold insert configured so that deformation of said mold insert under said pressing force generates three-dimensional compressing forces against said prepared mat causing densification and consolidation of said prepared mat, means for heating a surface of said prepared mat, means for permeating and heating said prepared mat with radiowave energy as said pressing force is applied, means for maintaining the temperature of said prepared mat to values less than approximately 400 degrees F., and means for confining said radiowave energy within a defined volume.

11. The apparatus of claim 10 wherein said porous support comprises a non-metal porous material.

12. The apparatus of claim 10 wherein said porous support comprises a porous surface member comprising a plurality of spaced non-metal tiles having a porous sheet member, said tiles being configured for venting of moisture between said tiles and permitting flexure of said non-metal porous surface member, said non-metal porous surface member further allowing transmission of said radiowave energy into said prepared mat, and a said tiles being supported and held substantially rigid by a support member.

13. The apparatus of claim 12 wherein said support member comprises a plurality of spaced rails to undergird and substantially support said tiles.

14. The apparatus of claim 13, wherein said support rails are of a height of approximately an integral number of half wavelengths of said radiowave energy to permit efficient transmission of said radiowave energy along a transmission path between said support rails.

15. The apparatus of claim 10, including a cavity enclosure containing said press member said porous support and said mold insert, and including an open volume having dimensions larger than approximately one wavelength of said radiowave energy and into which said radiowave energy is applied and distributed to permeate and heat said prepared mat, said radiowave energy being transmitted through said porous support and said mold insert, including means for causing said radiowave energy to be approximately uniformly distributed within said cavity enclosure to promote uniform heating of said prepared mat, and including means for preventing radiowave energy leakage from said apparatus as said pressing force is applied to said prepared mat.

16. The apparatus of claim 10, including means for moving in unison said press member, said porous support, and said mold insert as a moving assembly along a defined path, including means for continuously applying a force to said moving assembly over said defined path and including means for continuously applying said radiowave energy over said defined path of said moving assembly for continuous production of wood fiber objects.

17. The apparatus of claim 16, wherein said means for continuously applying a force comprises a plurality of rollers in contact with said press member of said moving assembly and a plurality of rollers in contact with said porous support of said moving assembly, the space between said rollers in contact with said press member and said rollers in contact with said porous support decreasing as said moving assembly proceeds along said defined path, compressing said prepared mat continuously.

18. The apparatus of claim 10, wherein said porous support and said press member are metallic and electrically insulated from each other, and including means for applying a radio frequency differential voltage to said metallic porous support and said metallic press member to provide low frequency radiowave heating of said prepared mat.

19. The apparatus of claim 10, including means for stacking said press member, said porous support, and said mold insert, so that a plurality of objects made from wood fiber, said objects comprising three-dimensional structures, may be dried and consolidated simultaneously.

* * * * *